(12) United States Patent
Park

(10) Patent No.: US 9,569,894 B2
(45) Date of Patent: Feb. 14, 2017

(54) GLASS TYPE PORTABLE DEVICE AND INFORMATION PROJECTING SIDE SEARCHING METHOD THEREOF

(71) Applicant: LG ELECTRONICS INC., Seoul (KR)

(72) Inventor: Jongkyeong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 221 days.

(21) Appl. No.: 14/323,981

(22) Filed: Jul. 3, 2014

(65) Prior Publication Data

US 2015/0015608 A1 Jan. 15, 2015

(30) Foreign Application Priority Data

Jul. 15, 2013 (KR) .......................... 10-2013-0083061

(51) Int. Cl.
```
G09G 5/00      (2006.01)
G06T 19/00     (2011.01)
G06F 3/01      (2006.01)
G02B 27/01     (2006.01)
```

(52) U.S. Cl.
CPC ........... *G06T 19/006* (2013.01); *G02B 27/017* (2013.01); *G06F 3/012* (2013.01); *G06F 3/013* (2013.01)

(58) Field of Classification Search
None
See application file for complete search history.

(56) References Cited

U.S. PATENT DOCUMENTS

| | | | |
|---|---|---|---|
| 2002/0057280 A1* | 5/2002 | Anabuki | G02B 27/017 345/633 |
| 2004/0056870 A1 | 3/2004 | Shimoyama et al. | |
| 2004/0193331 A1* | 9/2004 | Kashiwada | G02B 27/01 701/1 |
| 2004/0223190 A1* | 11/2004 | Oka | G06T 15/205 358/302 |
| 2006/0109266 A1* | 5/2006 | Itkowitz | G06F 3/016 345/419 |
| 2008/0024523 A1* | 1/2008 | Tomite | G06T 15/50 345/632 |

(Continued)

FOREIGN PATENT DOCUMENTS

| | | |
|---|---|---|
| EP | 2163937 | 3/2010 |
| EP | 2573737 | 3/2013 |

(Continued)

OTHER PUBLICATIONS

European Patent Office Application Serial No. 14175947.2, Search Report dated Oct. 13, 2014, 12 pages.

*Primary Examiner* — David H Chu
(74) *Attorney, Agent, or Firm* — Lee, Hong, Degerman, Kang & Waimey

(57) ABSTRACT

Disclosed are a glass-type portable device and a method of searching an information projecting side thereof. In occurrence of information to be displayed, a screen at which a user is staring is analyzed. Candidate UI regions, on which the information is to be displayed on the analyzed screen, are set. An optimum UI region which satisfies a preset condition is selected from the candidate UI regions. Then the information is displayed on the optimum UI region. Under such configuration, the glass-type portable device can effectively display information without blocking a user's view.

20 Claims, 20 Drawing Sheets

(56) References Cited

U.S. PATENT DOCUMENTS

| | | | | |
|---|---|---|---|---|
| 2011/0254861 | A1* | 10/2011 | Emura | G06F 3/0488 345/633 |
| 2012/0219178 | A1* | 8/2012 | Osako | G06T 7/20 382/103 |
| 2012/0250940 | A1* | 10/2012 | Kasahara | G06T 19/006 382/103 |
| 2014/0218361 | A1* | 8/2014 | Abe | G06T 19/006 345/424 |
| 2015/0097772 | A1* | 4/2015 | Starner | G06F 3/013 345/158 |
| 2015/0221133 | A1* | 8/2015 | Groten | G06K 9/00671 345/633 |

FOREIGN PATENT DOCUMENTS

| | | |
|---|---|---|
| WO | 2013/061504 | 5/2013 |
| WO | 2014/078037 | 5/2014 |

\* cited by examiner

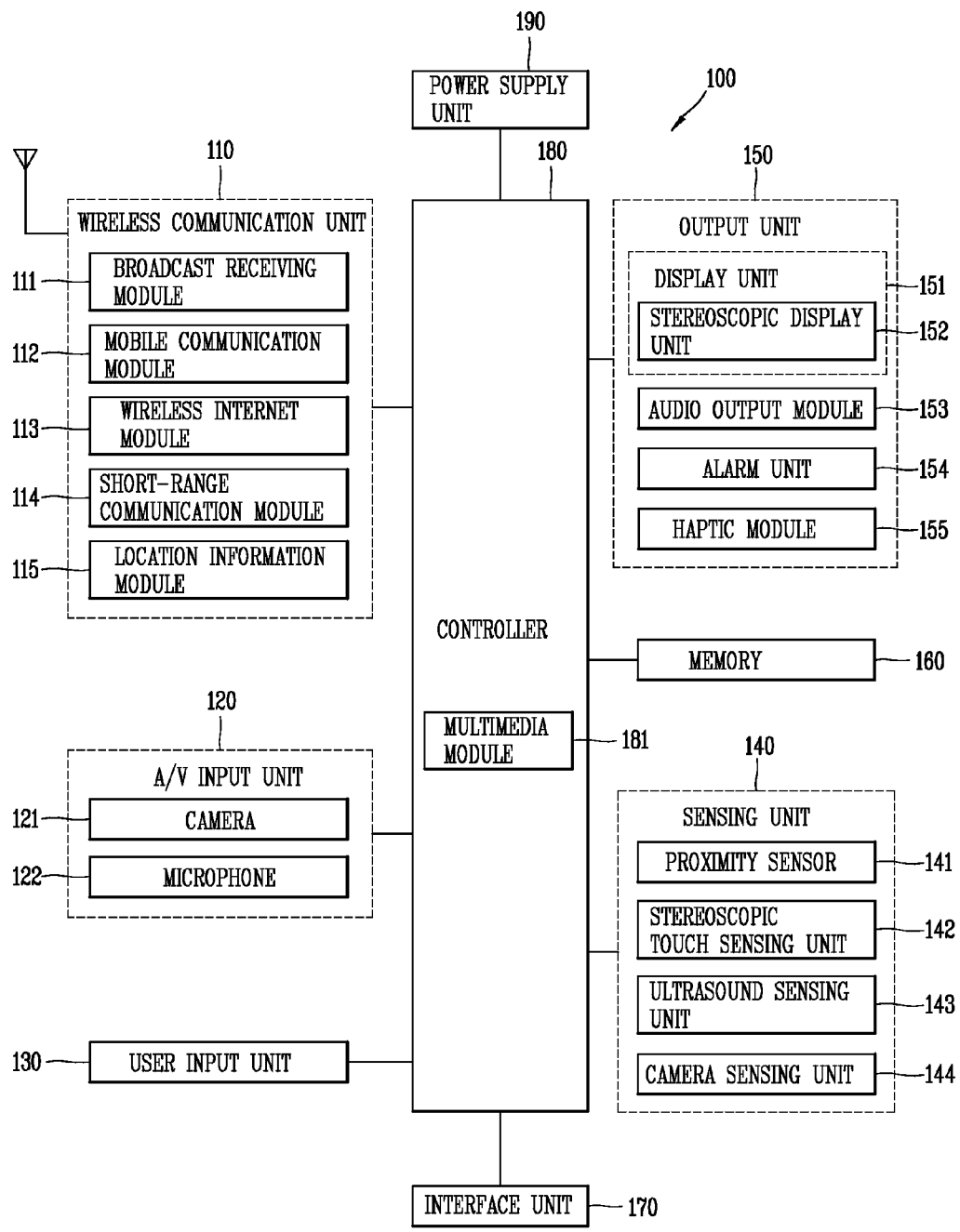

[CANDIDATE UI REGION]

FIG. 6B
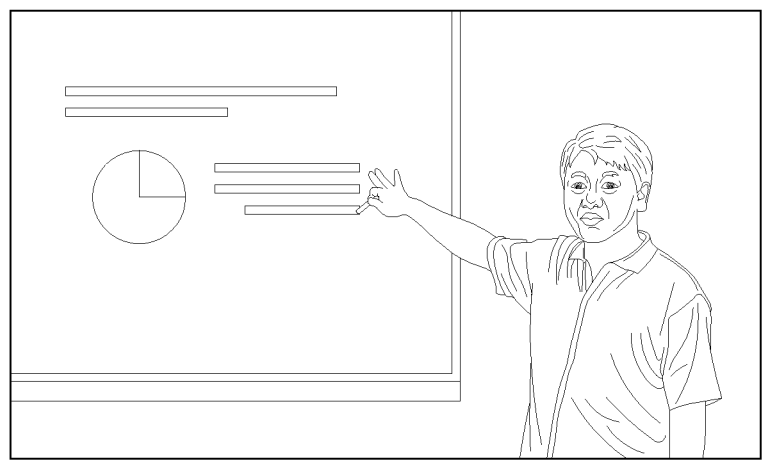
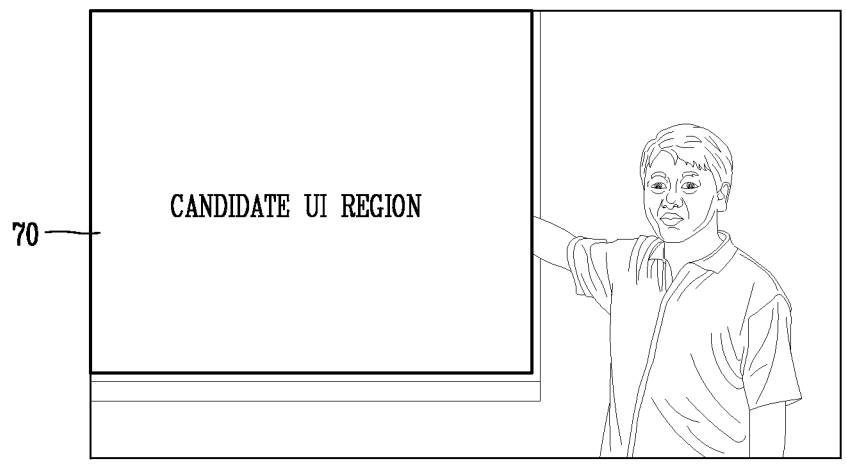

FIG. 6C
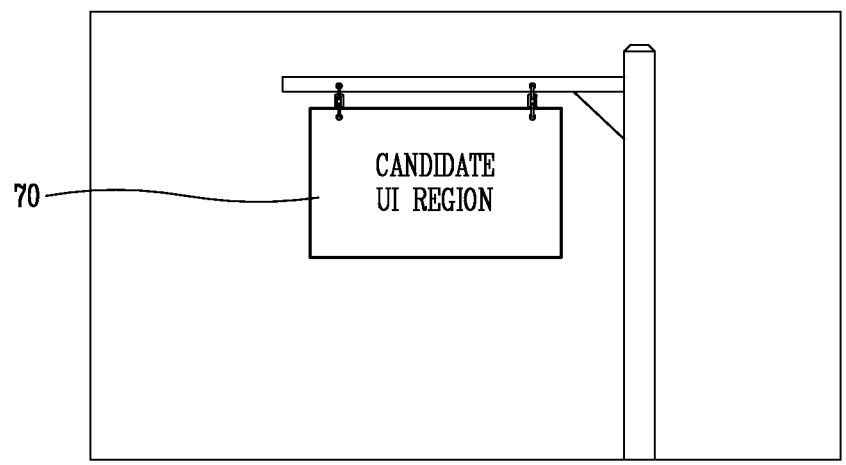

[DIRECT SELECTION OF CANDIDATE UI REGION BY USER]

[DIRECT SELECTION OF CANDIDATE UI REGION BY USER]

FIG. 9
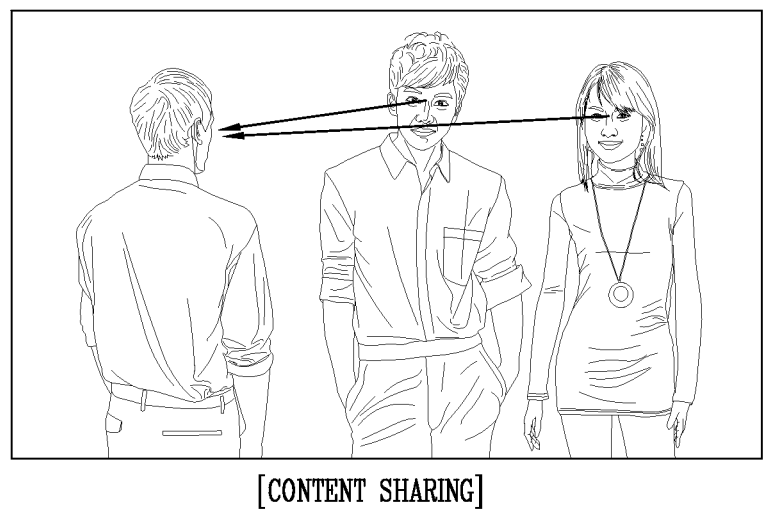
[CONTENT SHARING]
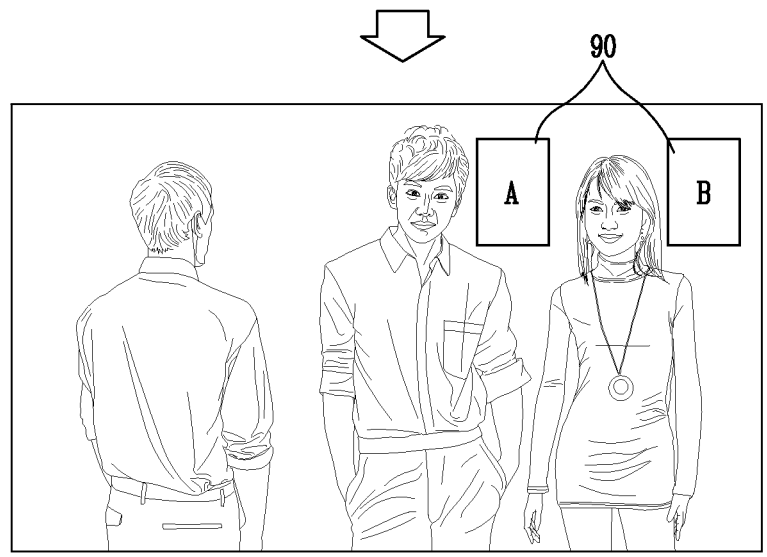
[DISPLAY SHARING CONTENT NEXT TO SHARERS]

[DISPLAY NOTIFICATION INFORMATION ON UI REGION]

FIG. 11A
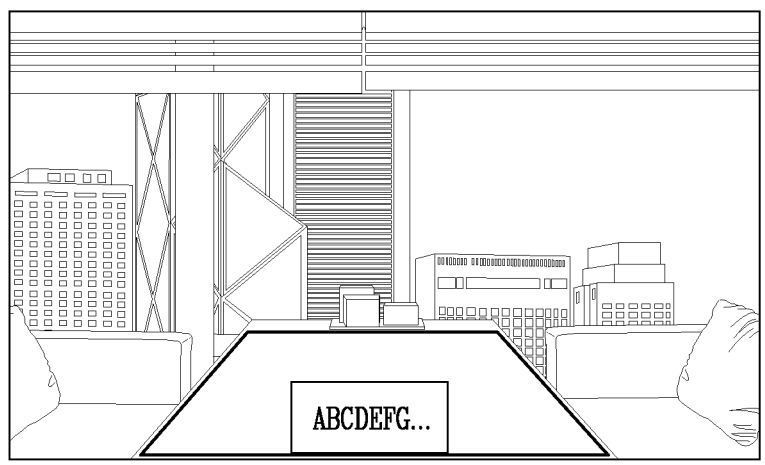
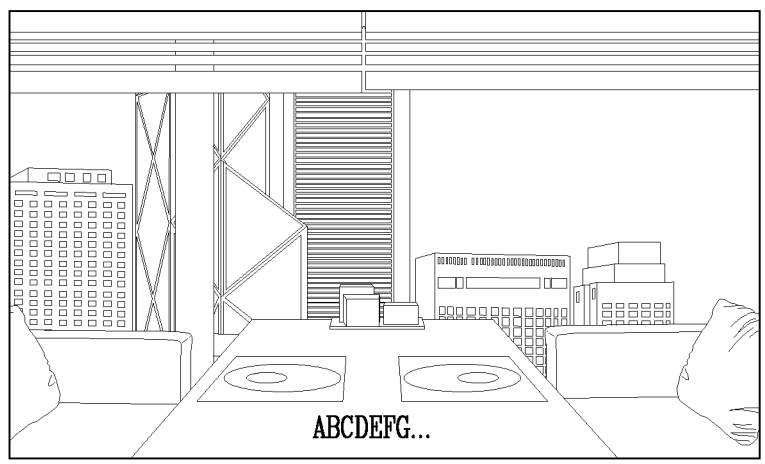
[DISPLAY ONLY CONTENT]

FIG. 11B
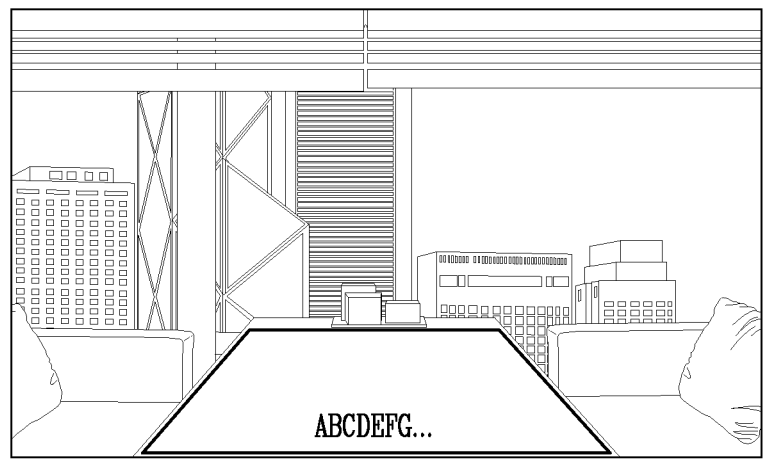
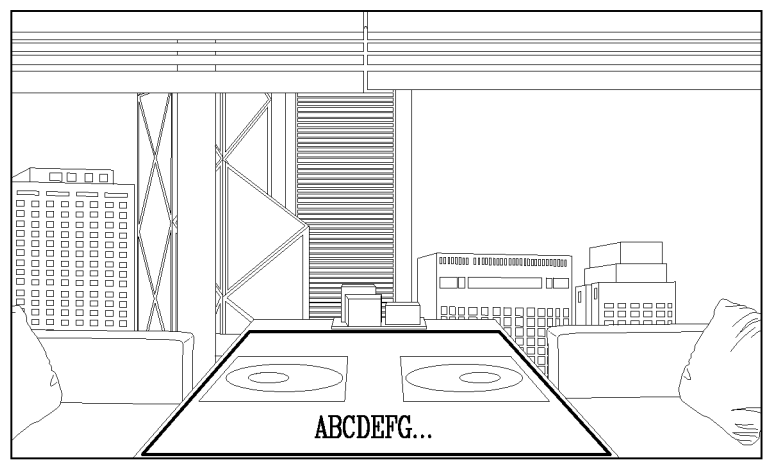
[DISPLAY ONLY EDGE OF UI REGION]

FIG. 13A
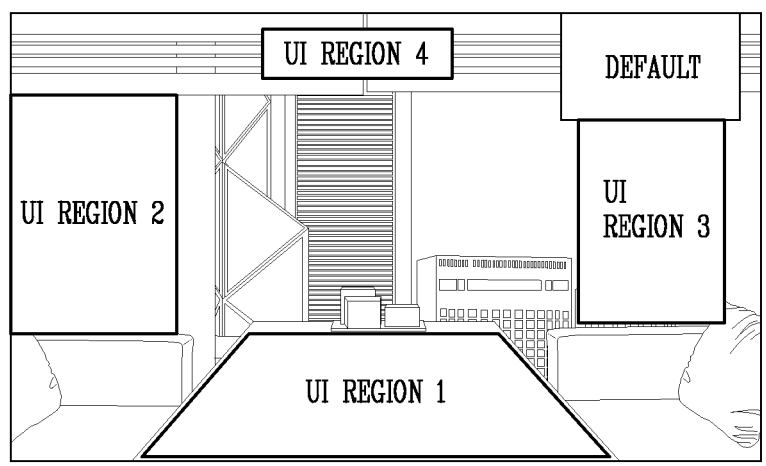
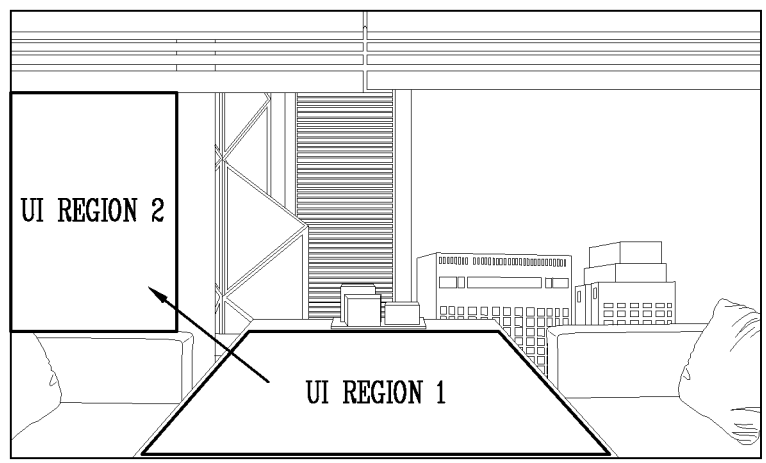
[CONVERSION OF UI REGION]

FIG. 13B
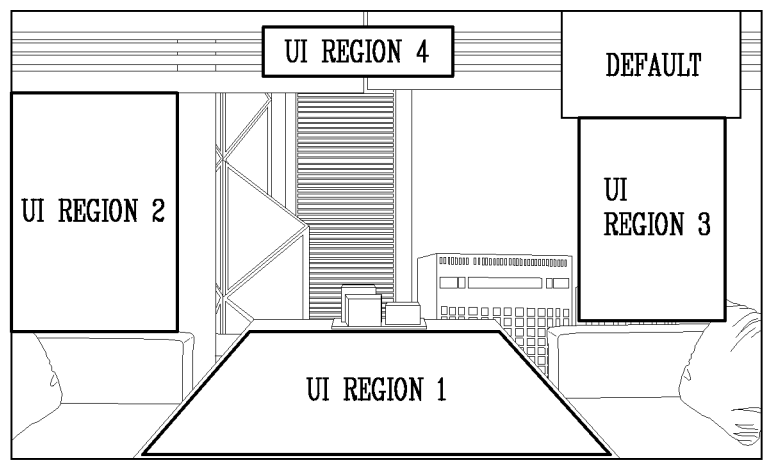
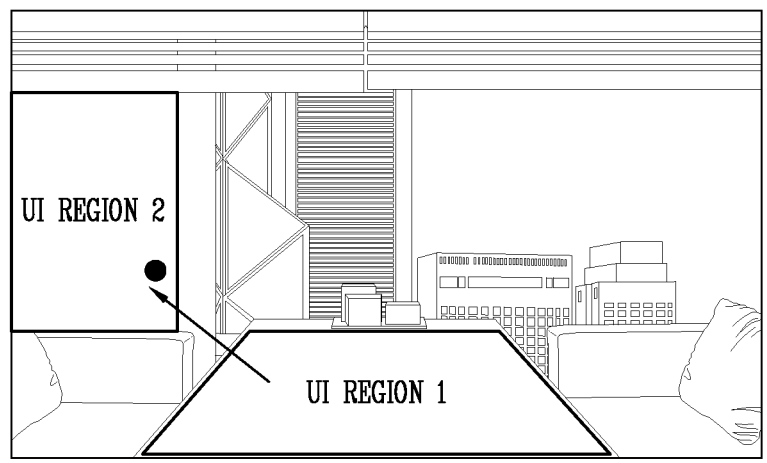
[CONVERT UI REGION AND DISPLAY DIRECTION ON EYELINE]

FIG. 13C
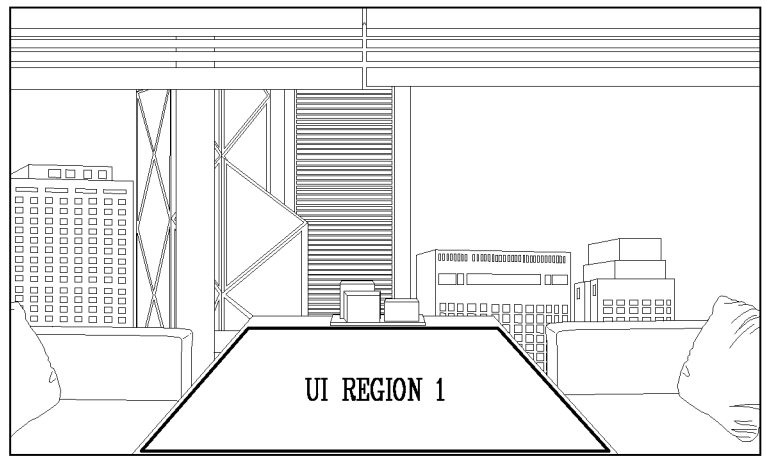
⬇ CONVERSION
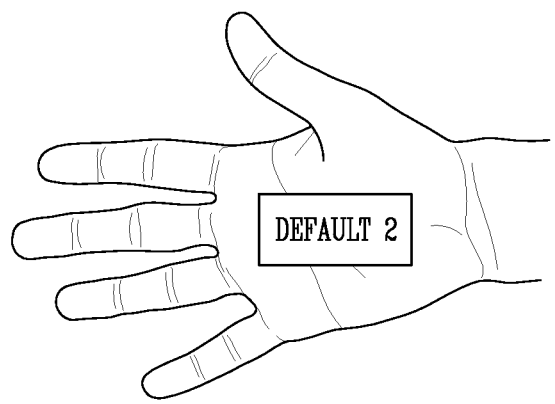
[DEFAULT REGION SUCH AS PALM]

FIG. 14A
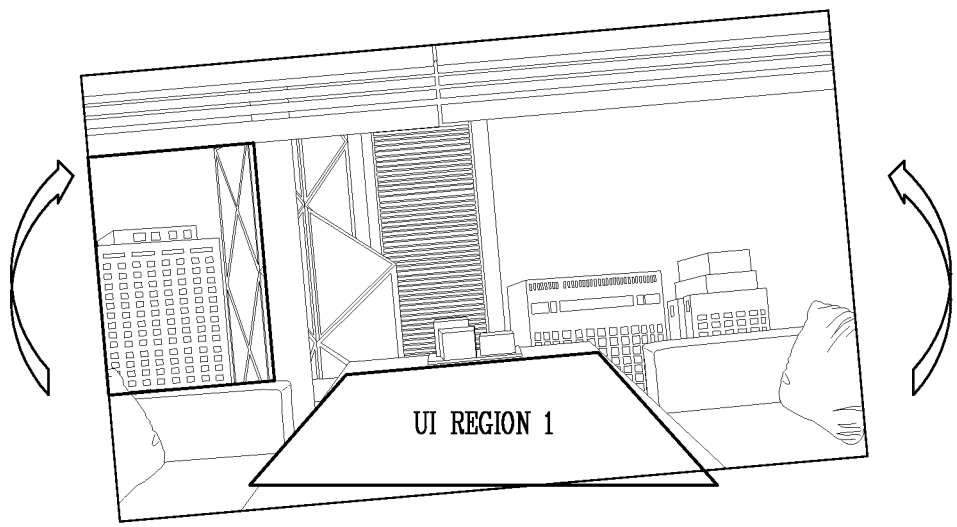
[CASE WHERE SCREEN IS CONTINUOUSLY CHANGED]
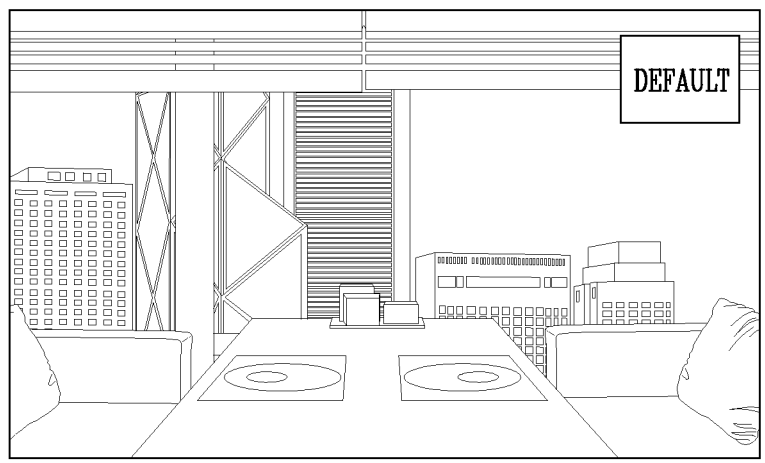
[FIX UI REGION TO DEFAULT REGION]

FIG. 14B
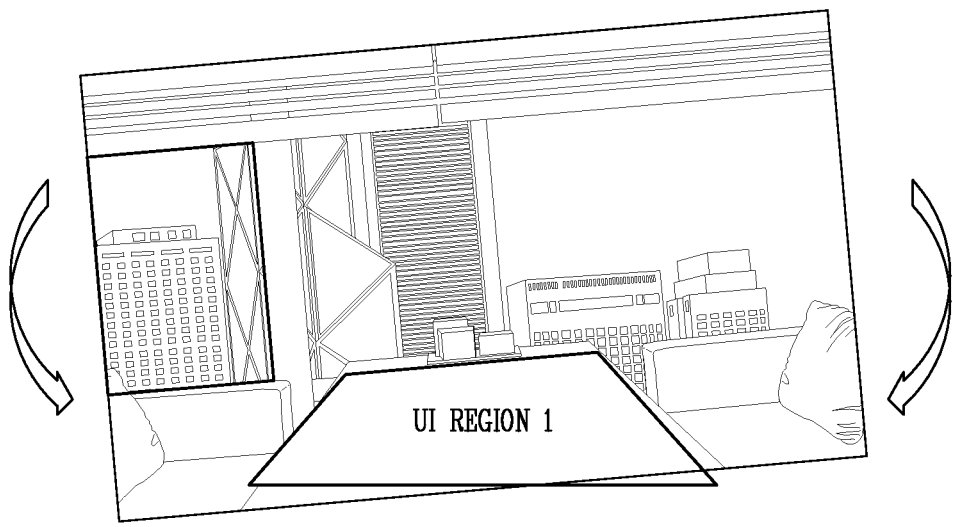
[CASE WHERE SCREEN IS CONTINUOUSLY CHANGED]
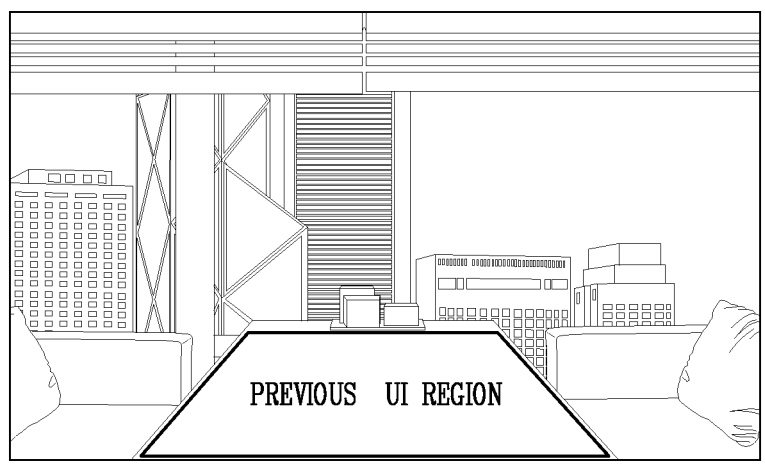
[FIX UI REGION TO PREVIOUS UI REGION]

GLASS TYPE PORTABLE DEVICE AND INFORMATION PROJECTING SIDE SEARCHING METHOD THEREOF

CROSS-REFERENCE TO RELATED APPLICATION

Pursuant to 35 U.S.C. §119(a), this application claims the benefit of earlier filing date and right of priority to Korean Application No. 10-2013-0083061, filed on Jul. 15, 2013, the contents of which is incorporated by reference herein in its entirety.

BACKGROUND OF THE DISCLOSURE

1. Field of the Disclosure

The present disclosure relates to a glass-type portable device, and particularly, to a glass-type portable device capable of effectively displaying information without blocking a user's view, and a method of searching an information projecting side thereof.

2. Background of the Disclosure

A mobile terminal may be configured to perform various functions. The examples of the various functions may include a data and voice communication function, a photo or video capture function through a camera, a voice storage function, a music file reproduction function through a speaker system, an image or video display function, and the like. Some mobile terminals may include an additional function capable of implementing games, and some other mobile terminal may be implemented as a multimedia player. Moreover, recent mobile terminals receive broadcast or multicast signals to allow the user to view video or television programs.

Furthermore, the efforts for supporting and enhancing the functions of the mobile terminal have been carried out. The foregoing efforts may include adding and improving software or hardware as well as changing and improving structural elements constituting a mobile terminal.

A glass-type portable device is a mobile terminal or a glass-type smart phone, which is a head up displayer worn on the head like glasses.

The glass-type portable device has a camera function, a video function and a microphone function, the functions implemented through a small and semi-transparent screen such as a glass lens in front of the eyes. The glass-type portable device also has a Wi-Fi function and a Bluetooth function, so that it can interwork and can be compatible with a smart phone or other types of communication devices. The glass-type portable device is a wearable smart device rather than a simple video player.

The glass-type portable device can capture moving images or still images with a user's view. A display function of the glass-type portable device is a function to display information as if a user views a monitor which is in front of the user by a predetermined distance. Therefore, a user can check e-mails in front of the eyes, and can download various types of applications, through the glass-type portable device.

However, such glass-type portable device still has a lot of problems to be solved, even if the operation and interworking technology thereof have been already disclosed. Especially, in the glass-type portable device, a user interface (UI) region should be displayed on a position not to block a user's view, due to a limitation of a display size.

If a UI region is displayed on a display unit in a fixed manner, a user may not be able to see the front side clearly while viewing the UI region. This may cause safety problems and may lower the user's cognition on the surroundings.

SUMMARY OF THE DISCLOSURE

Therefore, an aspect of the detailed description is to provide a glass-type portable device capable of providing an optimum UI region without blocking a user's view, and a method of searching an information projecting side thereof.

Another aspect of the detailed description is to provide a glass-type portable device capable of converting a UI region according to a user's movement, and a method of searching an information projecting side thereof.

To achieve these and other advantages and in accordance with the purpose of this specification, as embodied and broadly described herein, there is provided an information projecting side searching method of a glass-type portable device, the method including: analyzing an object within a user's view based on an image captured by a camera; setting one or more candidate UI regions on a display unit, based on a form and a position of the analyzed object; selecting an optimum UI region from the set candidate UI regions; and displaying desired information on the selected optimum UI region.

The information may include text information, image information, video information, or virtual reality information.

The candidate region may include a position where a motionless and flat object has been displayed, and a position where an object having a small number of letters or graphic elements thereon has been displayed.

The candidate UI region may be set according to a type of information to be displayed. If information to be displayed is text information, the candidate UI region may be set to a position where a user is accustomed to viewing letters. On the contrary, if information to be displayed is image information or video information, the candidate UI region may be set to a position where the number of colors to be compensated is smallest.

If information to be displayed is text information and if the candidate UI region is not quadrangular, the information may be adjusted so as to match the candidate UI region. The information may be adjusted in at least one of color, surface material, surface shape and optical source.

The optimum UI region may be selected from candidate UI regions set to an object close to a central region, an object having a large area, a rectangular object, an object having a small number of colors to be interpolated, and an object having a low illumination, wherein the candidate UI region set to an object close to a central region has a highest priority.

If the optimum UI region is larger than information to be displayed, the UI region may not be displayed, but only content or an edge of the UI region may be displayed.

The method may further include converting the optimum UI region into another UI region according to a user's input, wherein the user's input includes an eye blinking, an eye line change through pupil recognition, a voice input, a head movement in right and left directions, and a head inclination.

The method may further include changing the optimum UI region into another UI region according to a change of a user's view.

The method may further include: if a user's view is continuously changed, calculating a difference between a previous view and a current view based on an image captured by a camera; and fixing the UI region to a specific position if the calculated difference is more than a predetermined value, wherein the specific position includes a default region or a previous UI region.

To achieve these and other advantages and in accordance with the purpose of this specification, as embodied and broadly described herein, there is also provided a glass-type portable device, including: a display unit configured to display information; a camera configured to recognize an object; and a controller configured to set at least one candidate UI region on the display unit, by analyzing a form and a position of an object within a user's view, based on an image captured by the camera, configured to select an optimum UI region from the candidate UI regions, and configured to display information on the optimum UI region.

The information may include text information, image information, video information, or virtual reality information.

The candidate region may be set to a motionless and flat position, and a position on which a small number of letters or graphic elements have been displayed.

The controller may set a candidate UI region according to a type of information to be displayed. If information to be displayed is text information, the controller may set a candidate UI region to a position where a user is accustomed to viewing letters. On the contrary, if information to be displayed is image information or video information, the controller may set a candidate UI region to a position where the number of colors to be compensated is smallest.

If information to be displayed is text information and if the candidate UI region is not quadrangular, the controller may adjust the information so as to match the candidate UI region. The information may be adjusted in at least one of color, surface material, surface shape and optical source.

The controller may select the optimum UI region from candidate UI regions set to an object close to a central region of the display unit, an object having a large area, a rectangular object, an object having a small number of colors to be interpolated, and an object having a low illumination, wherein the candidate UI region set to an object close to a central region of the display unit has a highest priority.

If the optimum UI region is larger than information to be displayed, the controller may not display the UI region, but may display only content or an edge of the UI region.

The controller may convert the optimum UI region into another UI region according to a user's input, wherein the user's input includes an eye blinking, an eye line change through pupil recognition, a voice input, a head movement in right and left directions, and a head inclination.

The controller may output a conversion animation and display a direction of a user's eye line, at the time of converting the UI region.

The controller may change the optimum UI region into another UI region according to a change of a user's view.

If a user's view is continuously changed, the controller may calculate a difference between a previous view and a current view based on an image captured by the camera. Then the controller may fix the UI region to a specific position if the calculated difference is more than a predetermined value. The specific position may include a default region or a previous UI region.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram of a mobile terminal according to an embodiment of the present invention;

FIGS. 6A to 6C are views illustrating an embodiment to set a candidate UI region in a glass-type portable device according to the present invention;

FIG. 9 is a view illustrating an example where to display content next to sharers, in case of sharing the content with others;

FIGS. 11A and 11B are views illustrating a display method in a case where content to be displayed does not match a UI region in size and ratio;

FIGS. 13A to 13C are views illustrating an embodiment to convert the UI region of FIG. 12; and FIGS. 14A and 14B are views illustrating a method of displaying a UI region when a background image is converted a lot of times as a user's eye line is continuously changed.

DETAILED DESCRIPTION OF THE DISCLOSURE

Figure 2A:
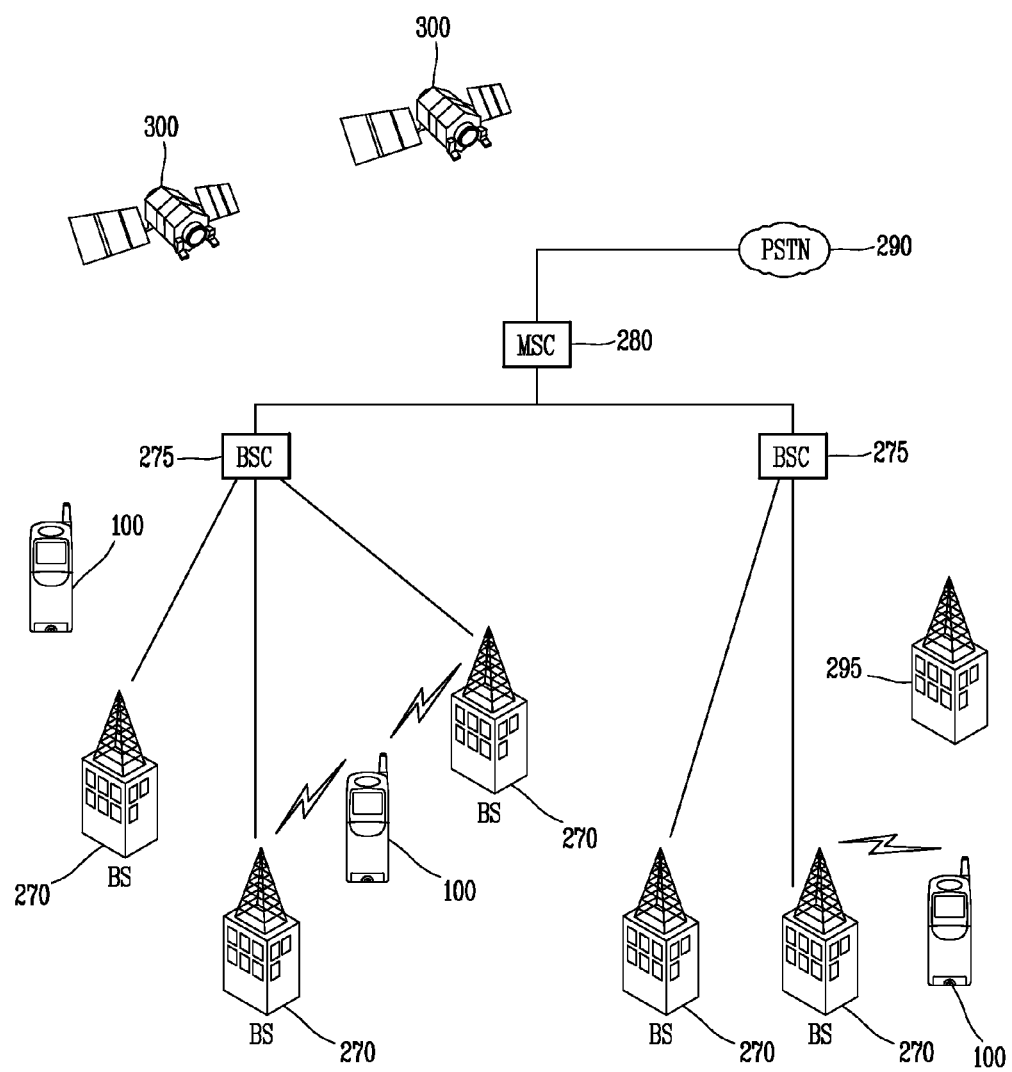
FIG. 2A is a block diagram of a wireless communication system where a mobile terminal according to an embodiment of the present invention can operate.

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

FIG. 1 is a block diagram of a mobile terminal 100 in accordance with one exemplary embodiment.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input to the touch sensor. Examples of the touch object may include a finger, a touch pen, a stylus pen, a pointer or the like.

When touch inputs are sensed by the touch sensors, corresponding signals are transmitted to a touch controller.

The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the mobile terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2B:
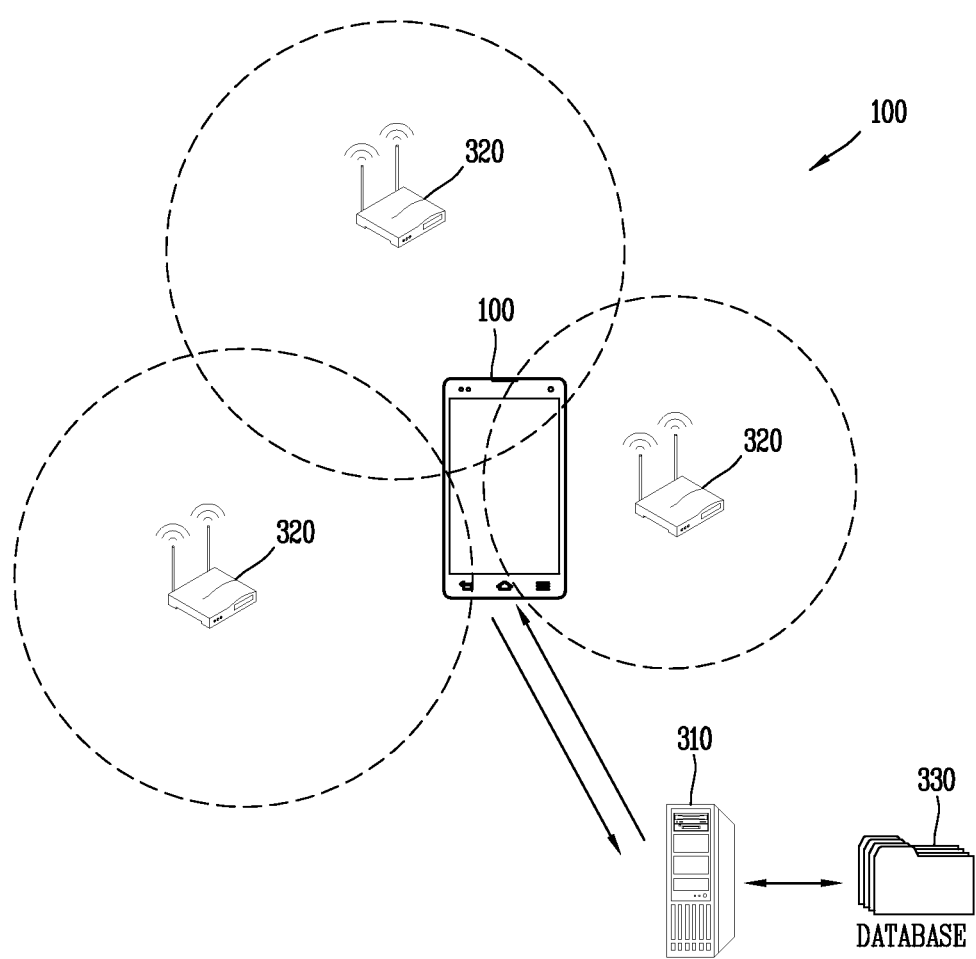
FIG. 2B is a view illustrating a configuration of a Wi-Fi positioning system where a mobile terminal according to an embodiment of the present invention can operate.

FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminals 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

The present invention is applied to the mobile terminal 100. The mobile terminal 100 includes a glass-type wearable device or a glass-type portable device.

In the present invention, in the occurrence of information to be displayed, an object which is in a user's eye line direction is analyzed based on an image captured by a camera. Then at least one candidate UI region, on which information is displayable on a display unit, is set based on a shape and a position of the analyzed object. Then a UI region which satisfies a preset condition is selected from the set candidate UI regions, for display of information.

Figure 3:
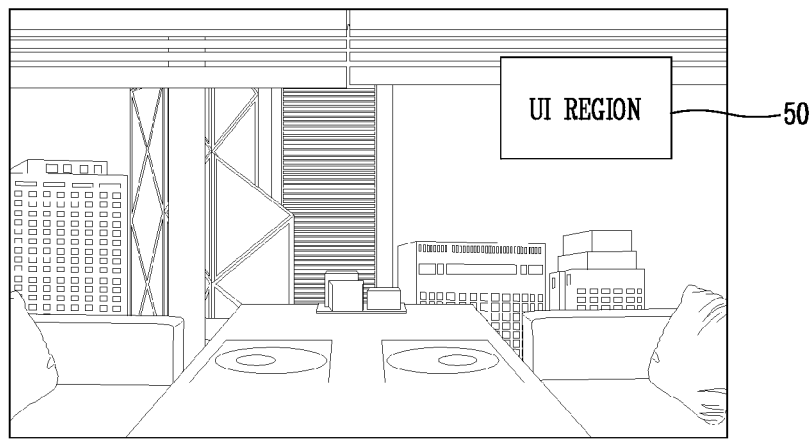
FIG. 3 is a view illustrating an example of a User Interface (UI) region displayed on a glass-type device in accordance with the conventional art.

FIG. 3 is a view illustrating an example of a User Interface (UI) region displayed on a glass-type device in accordance with the conventional art.

As shown in FIG. 3, a UI region 50 is fixed to a right upper end of the conventional glass-type device. Thus images, events and various types of content are displayed only on the UI region 50.

If the UI region 50 is in a fixed state, a user cannot see the front side while he or she is viewing the UI region 50. This may cause safety problems, and may prevent the user from recognizing his or her surroundings.

Thus, the present invention proposes a method of searching a projecting side in a glass-type portable device, the method capable of changing a UI region according to a type of information to be displayed or a form of a projecting side, unlike the conventional method to display a UI region on a fixed position.

Figure 4:
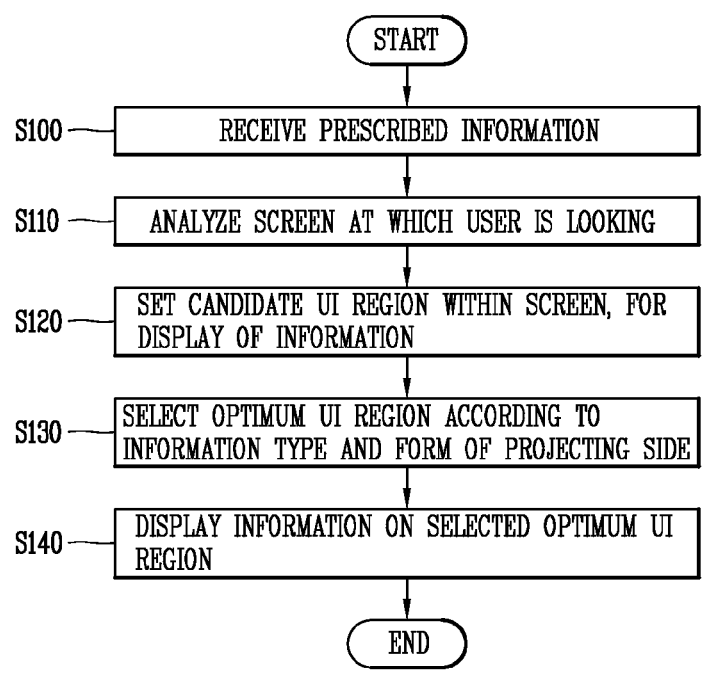
FIG. 4 is a flow chart illustrating a method of searching an information projecting side of a glass-type portable device according to an embodiment of the present invention.
Figure 5:
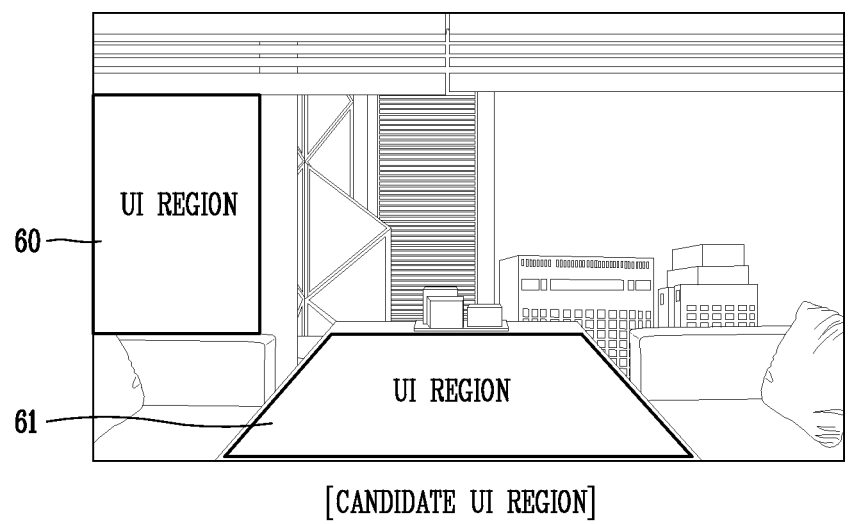
FIG. 5 is a view illustrating an example to use a UI region in a variable manner.

FIG. 4 is a flow chart illustrating a method of searching an information projecting side of a glass-type portable device according to an embodiment of the present invention, and FIG. 5 is a view illustrating an example to use a UI region in a variable manner.

As shown in FIG. 4, a user can see a scene (or a background) formed in front of him or her, through a glass-type portable device. In this case, upon receipt of information (or an event) to be displayed, the controller 180 analyzes real time a shape and a position of the object being currently viewed by the user through the camera 121. Then the controller 180 sets at least one candidate projecting side (i.e., candidate UI region or candidate region) where received information can be displayed on the display unit 151) (S100~S120).

The information is various types of content, which includes text information (e-mail, SMS), image information, video data and virtual reality data. The candidate UI region is set with consideration of the following factors.

Objects which are flat and motionless: Window, desk, blackboard, floor, sky, etc.

Objects having a small number of alphabets or graphic elements on the surface thereof Type of information to be displayed That is, as the candidate UI region, a flat and motionless object is preferentially determined. However, an object having a small number of alphabets or graphic elements on the surface thereof is preferable. Especially, the candidate UI region may be variable according to a type of information to be displayed. For instance, an SMS is preferentially displayed on an object which is close to a central region of a display unit even if the object is small. On the contrary, an image is preferentially displayed on a large object. The set candidate UI region may be temporarily stored in the memory 160.

Upon setting of at least one candidate UI region, the controller 180 selects an optimum UI region according to a type of information to be displayed and a form of a projecting side (S130). The optimum UI region is determined based on the following criteria.

Distance from the center (Direction of eye line)

Area of object (Large area is advantageous)

Shape of object (Rectangular shape)

The number of colors to be interpolated (Small number is advantageous)

Illumination

The above criteria have values. The values are decreased toward the lower side from the upper side. That is, when determining an optimum UI region, a direction of a user's eye line and an area of an object are considered most preferentially, and other factors are additionally considered. In a case where there are a plurality of candidate UI regions, the controller 180 may select a largest area. In a case where one or more conditions are satisfied, an area having a smallest motion may be selected.

As shown in FIG. 5, UI regions 60 and 61 may be displayed in a variable manner, not in a fixed manner. Once an optimum UI region is determined, the controller 180 displays the received information on a corresponding region (S140).

Hereinafter, a preferred embodiment of the present invention will be explained in more detail with reference to the attached drawings.

Figure 6A:
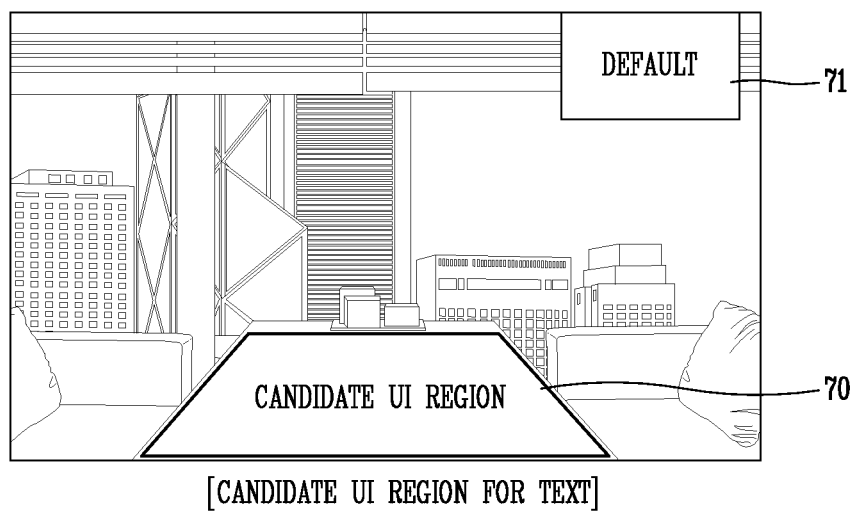

FIGS. 6A to 6C are views illustrating an embodiment to set a candidate UI region in a glass-type portable device according to the present invention.

As shown in FIG. 6A, in a case where received content is a text, a region where a user is accustomed to seeing letters based on cognitive science (i.e., central region) is set as a candidate UI region 70.

Alternatively, the candidate UI region may be a flat object having little motion, such as a window, a desk and a blackboard. If a user looks at the floor, the sky or the ceiling, the floor, the sky or the ceiling may be a candidate UI region.

If the candidate UI region 70 has a quadrangular shape or a rectangular shape (rather than a square shape), the controller 180 controls original data of information to be adjusted so that the information can seem to be covered by an object (e.g., desk) when being actually displayed.

Items to be adjusted may include a color, a surface material, a surface shape, an optical source, etc.

Especially, in a case where a corresponding candidate UI region has a lot of regions to be compensated, the candidate UI region is excluded from a group of candidate UI regions, and a next priority is searched. If there is no candidate UI region matching the condition, a default region 71 is set as a UI region.

FIG. 6B illustrates an example to set a blackboard as the candidate UI region 70, and FIG. 6C illustrates an example to set a bulletin board as the candidate UI region 70.

Figure 7:
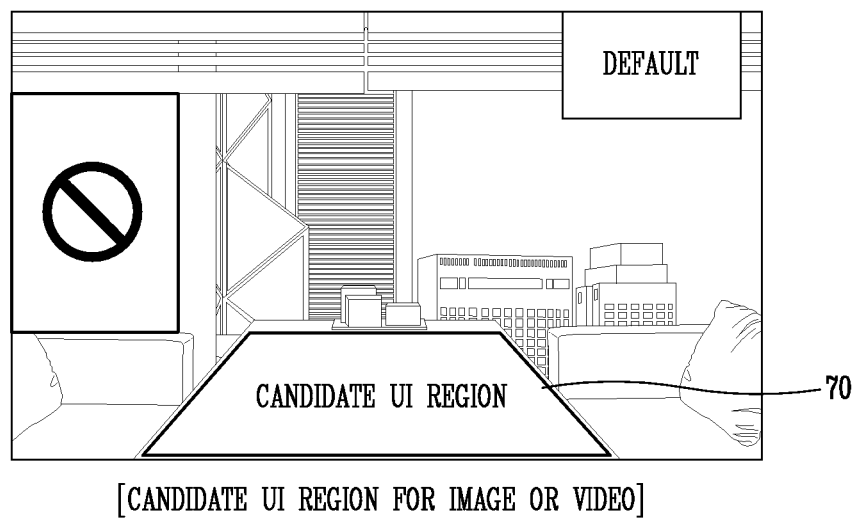
FIG. 7 is a view illustrating an embodiment to set a candidate UI region, in a case where information to be displayed is image information or video information.

FIG. 7 is a view illustrating an embodiment to set a candidate UI region, in a case where information to be displayed is image information or video information.

As shown in FIG. 7, in a case where information to be displayed is image information or video information, the controller 180 searched for a region having a smallest number of colors to be compensated. Then the controller 180 sets the region as the candidate UI region 70. The optimum candidate UI region 70 is displayed so as to be opaque.

Figure 8A:
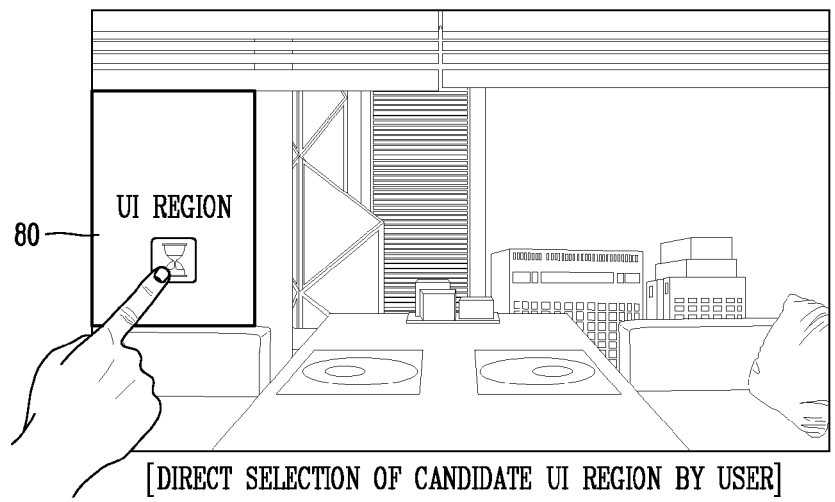
FIGS. 8A and 8B are views illustrating an embodiment to directly set a UI region by a user.
Figure 8B:
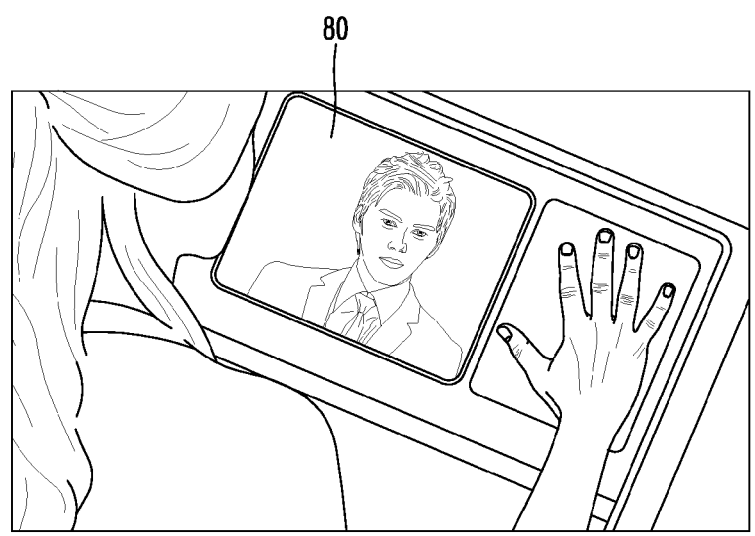

FIGS. 8A and 8B are views illustrating an embodiment to directly set a UI region by a user.

In the present invention, a UI region is automatically determined based on an area of an object included in a screen at which a user is staring, a distance and a shape of the object, the number of colors to be interpolated, and an illumination. However, the UI region may be directly determined by a user.

As shown in FIG. 8A, if a user selects a specific position using his or her finger and then the user's finger contacts the specific potion for a predetermined time, the controller 180 may determine the specific position as an optimum UI region 80. As shown in FIG. 8B, if a user's palm contacts a specific object, the controller 180 may determine a flat region closest to the specific object as the optimum UI region 80.

FIG. 9 is a view illustrating an example to display content next to sharers, in case of sharing the content with others.

For instance, a user may receive a prescribed image from a friend A, and may receive music from a friend B on the same place, thereby sharing the prescribed image and music. In this case, if the user looks at the friends A and B, the controller 180 may display sharing information 90 next to the friends A and B, through facial recognition. This enables the user to easily recognize a person who is sharing information with the user. This embodiment is advantageous to a group play of multimedia content, a group discussion, etc.

In the present invention, upon arrival of notification information, the notification information is directly displayed on a candidate region, or is displayed by a user's selection.

Figure 10:
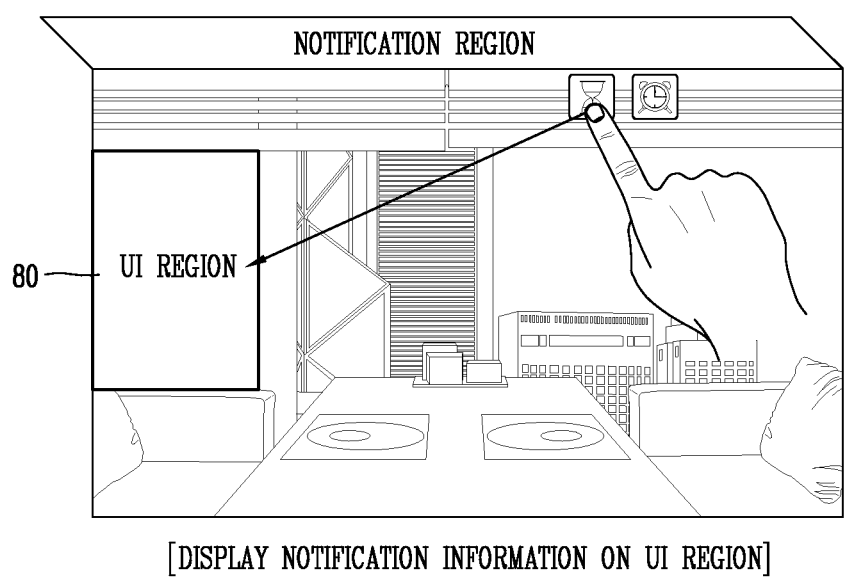
FIG. 10 is a view illustrating an example to display notification information on a UI region, in a state where a notification region has been fixed to a specific position.

FIG. 10 is a view illustrating an example to display notification information on a UI region, in a state where a notification region has been fixed to a specific position.

Referring to FIG. 10, if notification information occurs in a state where a notification region has been fixed to a specific position, a gradation, an icon, sound or the like is displayed in a corresponding direction.

Once a user indicates an intention to view the notification information using a voice, a hand, time delay, etc., the notification information is displayed on a UI region 80 together with a prescribed animation (e.g., fly down or slide down), etc.

FIGS. 11A and 11B are views illustrating a display method in a case where content to be displayed does not match a UI region in size and ratio.

In case of displaying received content on a UI region, the UI region may be much larger than the content. In this case, in order to prevent lowering of recognition of the surroundings by the glass-type portable device, the controller 180 may display only content without displaying the UI region (refer to FIG. 11A). Alternatively, the controller 180 may display only an edge of the UI region (refer to FIG. 11B).

That is, if content to be displayed does not match a UI region in size or ratio, the controller 10 displays the content in a different manner according to a mode. For instance, if the current mode is an automatic mode, the controller 180 does not display a UI region in a case where an object corresponding to the UI region needs not be compensated.

Figure 12:
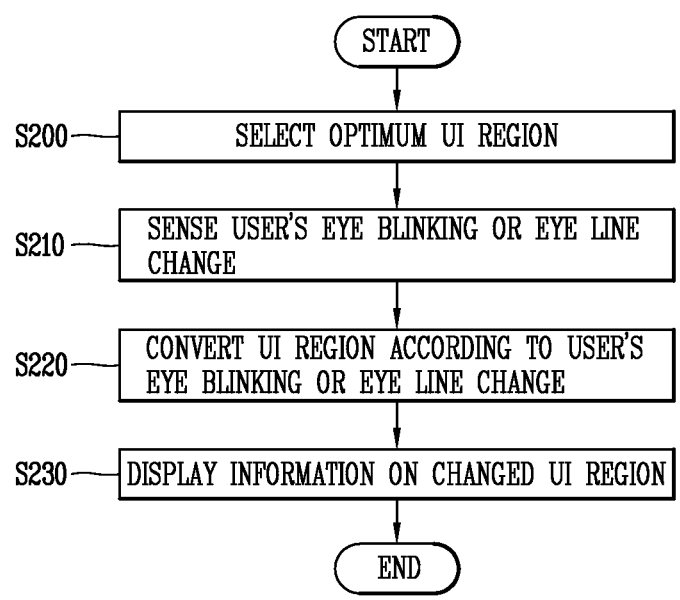
FIG. 12 is a flow chart illustrating an operation to convert a UI region according to a user's eye blinking or eye line change.

FIG. 12 is a flow chart illustrating an operation to convert a UI region according to a user's eye blinking or eye line change.

A plurality of candidate UI regions may exist on a screen according to an image at which a user is staring, the image which is on the front side. If the number of candidate UI regions is 2 or more in a case where the current mode is an automatic mode, the controller 180 automatically selects an optimum UI region and displays it (S200). If a user does not like the selected UI region, the user may select a UI region on another position using the following methods.

1. Eye blinking
2. Closest region to which an eye line is toward
3. Voice command such as re-adjustment
4. Direction toward which the head moves or is tilted The controller 180 senses such eye movement, voice input, and head movement of a user (S210). Next, the controller 180 converts the currently-displayed UI region into another UI region, and then displays received information on said another UI region (S240).

FIGS. 13A to 13C are views illustrating an embodiment to convert the UI region of FIG. 12.

In a state where an optimum UI region (UI region 1) has been selected to be displayed, if a user blinks his or her eyes two times or more, the controller 180 converts the selected UI region 1 into UI region 2 as shown in FIG. 13A. The controller 180 controls the user to recognize the conversion of the UI region, using a conversion animation (fade in out, transition, rotate and etc.).

As another embodiment, as shown in FIG. 13B, the controller 180 displays the UI region 2, on a region determined, through a pupil recognition method, as a region closest to a direction toward which a user's eye line is. Then, the controller 180 displays the eye line direction on the UI region 2, in the form of a colored dot, an eye-shaped icon, a cross, an arrow, etc.

As another embodiment, the controller 180 may display a UI region of a next priority, through recognition of a user's voice such as "re-adjustment", or may control a user to search for an optimum UI region.

Finally, if a user shakes the head right and left, or if the user inclines the head to one direction, the controller 180 recognizes the motion using sensors mounted therein UI to thus re-adjust the UI region. Then if there exists no UI region to be converted, the controller 180 displays a default region.

Especially, a user may change a UI region by changing a scene (background) being currently viewed. The change of the scene means a change of a visual field. As shown in FIG. 13C, if a user changes a direction of his or her eye line, from outside of a window, to clothes or a part of the body such as the palm, the controller 180 converts a previous UI region into a new UI region, i.e., a default region such as the palm.

If a user converts a direction of his or her eye line from outside of a window to a watch phone, a smart phone, a wearable computer or a printer, the controller 180 may convert a UI region into the corresponding device and may output information according to characteristics of the corresponding device (e.g., output function or display function).

FIGS. 14A and 14B are views illustrating a method of displaying a UI region when a background image is converted a lot of times as a user's eye line is continuously changed.

If a screen (background image) is continuously changed as continuous changes of a user's eye line, a UI region is also continuously changed. This may lower visibility.

In the present invention, for an enhanced visibility, when a user's eye line is continuously changed, a difference of rotation vectors is recognized using a gyro sensor. Then a UI region is fixed with consideration of the recognized difference of the rotation vectors.

That is, it is checked how much the glass-type portable device has moved from an image captured by the camera, based on an image processing shift algorithm, etc. If it is determined that a screen has moved by more than a predetermined value, a UI region is fixed to a default region. The default region may be a right upper region or a previous UI region, for example.

As aforementioned, in the present invention, upon reception of prescribed information in a state where a user has worn the glass-type portable device, a screen (background or scene) at which the user is staring is analyzed real time, so that a region (UI region or projecting side) on which the information is effectively displayable can be searched. As corresponding information is displayed on an optimum region, the user can effectively check the received information without lowering cognition on his or her surroundings.

According to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet). The processor may include the controller of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for positioning a display region for displaying information at a glass-type wearable device, the method comprising:
   analyzing a shape and a position of an object within an image captured by a camera of the device, the image corresponding to a user's view;
   generating at least one display region on a display of the device based on the analyzed shape and position of the object and a type of the information to be displayed, wherein a position and a number of the at least one display region are determined according to the analyzed shape and position of the object, the generated at least one display region being displayed on the object;
   selecting one of the at least one display region that is positioned at a specific position of the display; and
   projecting the information onto the selected one of the at least one display region such that the information is displayed at the specific position of the display,
   wherein the position of the generated at least one display region is variable according to the type of the information to be displayed.

2. The method of claim 1, wherein:
   the information comprises information stored in a memory of the device and information originated from an external source; and
   the information further comprises a user interface (UI), text information, image information, video information, or virtual reality information.

3. The method of claim 1, wherein the at least one display region is generated at:
   a position of the display where a motionless and flat object is displayed; or
   a position of the display where an object having a small number of letters or graphic elements on its surface is displayed.

4. The method of claim 1, wherein:
   the at least one display region is generated at a position of the display where the user is accustomed to viewing letters when the information is text information; and
   the at least one display region is generated at a position of the display where a number of colors to be compensated is smallest when the information is image information or video information.

5. The method of claim 4, wherein:
   the information is adjusted to match the at least one display region when the information is text information and the at least one display region is not quadrangular; and
   the information is adjusted in at least one of a color, a surface material, a surface shape, or an optical source.

6. The method of claim 1, wherein:
   the at least one display region comprises at least one of a display region generated at an object that is close to a central region of the display, a display region generated at a large-sized object, a display region generated at a rectangular object, a display region generated at an object having a small number of colors to be interpolated, or a display region generated at an object having a low illumination;
   the display region generated at the object that is close to the central region has a highest priority among the display regions; and
   the one of the at least one display region is selected based on its priority such that the display region generated at the object that is close to the central region is selected as the one of the at least one display region when the at least one display region comprises the object that is close to the central region.

7. The method of claim 1, further comprising displaying only content or an edge of the one of the at least one display region when a size of the selected one of the at least one display region is larger than a size of the information to be displayed.

8. The method of claim 1, further comprising:
   switching from the selected one of the at least one display region to another display region in response to user input, the user input comprising a movement generated by the user or a voice input generated by the user,
   wherein the movement comprises an eye blinking, an eye line change through pupil recognition, a head movement in right and left directions, and a head inclination.

9. The method of claim 1, further comprising:
   switching from the selected one of the at least one display region to another display region in response to a change of the image corresponding to the user's view.

10. The method of claim 1, further comprising:
   calculating a difference between a previous view and a current view based on the captured image when the user's view is continuously changed; and
   setting the selected one of the at least one display region to a fixed position of the display when the calculated difference is greater than a threshold value,
   wherein the fixed position corresponds to a default region or a previous display region generated during the previous view.

11. A glass-type wearable device, comprising:
   a projector projecting information;
   a display configured to display the information;
   a camera configured to capture an image including an object; and
   a controller configured to:
      analyze a shape and a position of the object within the image, the image corresponding to a user's view;
      generate at least one display region on the display based on the analyzed shape and position of the object and a type of the information to be displayed, wherein a position and a number of the at least one display region are determined according to the analyzed shape and position of the object, the generated at least one display region being displayed on the object;
select one of the at least one display region that is positioned at a specific position of the display; and
cause the projector to project the information onto the selected one of the at least one display region such that the information is displayed at the specific position of the display,
wherein the position of the generated at least one display region is variable according to the type of the information to be displayed.

12. The device of claim 11, wherein:
the information comprises information stored in a memory of the device and information originated from an external source;
the information comprises a user interface (UI), text information, image information, video information, or virtual reality information; and
the at least one display region is generated at a position of the display where a motionless and flat object is displayed or at a position of the display where a small number of letters or graphic elements are displayed.

13. The device of claim 11, wherein the controller is further configured to:
generate the at least one display region at a position of the display where the user is accustomed to viewing letters when the information is text information; and
generate the at least one display region at a position of the display where a number of colors to be compensated is smallest when the information is image information or video information.

14. The device of claim 13, wherein the controller is further configured to:
adjust the information to match the at least one display region when the information is text information and the at least one display region is not quadrangular; and
adjust the information in at least one of a color, a surface material, a surface shape, or an optical source.

15. The device of claim 11, wherein:
the at least one display region comprises at least one of a display region generated at an object that is close to a central region of the display, a display region generated at a large-sized object, a display region generated at a rectangular object, a display region generated at an object having a small number of colors to be interpolated, or a display region generated at an object having a low illumination;
the display region generated at the object that is close to the central region has a highest priority among the display regions; and
the controller is further configured to select the one of the at least one display region based on its priority such that the display region generated at the object that is close to the central region is selected as the one of the at least one display region when the at least one display region comprises the object that is close to the central region.

16. The device of claim 11, wherein the controller is further configured to cause the display to display only content or an edge of the one of the at least one display region when a size of the selected one of the at least one region is larger than a size of the information to be displayed.

17. The device of claim 11, wherein the controller is further configured to switch from the selected one of the at least one display region to another display region in response to user input, the user input comprising a movement generated by the user or a voice input generated by the user,
wherein the movement comprises an eye blinking, an eye line change through pupil recognition, a head movement in right and left directions, and a head inclination.

18. The device of claim 17, wherein the controller is further configured to cause the display to display a conversion animation and display a direction of the user's view when the display region is switched to the other display region.

19. The device of claim 11, wherein the controller is further configured to switch from the selected one of the at least one display region to another display region in response to a change of the image corresponding to the user's view.

20. The device of claim 11, wherein the controller is further configured to:
calculate a difference between a previous view and a current view based on the captured image when the user's view is continuously changed; and
set the selected one of the at least one display region to a fixed position of the display when the calculated difference is greater than a threshold value,
wherein the fixed position corresponds to a default region or a previous display region generated during the previous view.

* * * * *